UNITED STATES PATENT OFFICE.

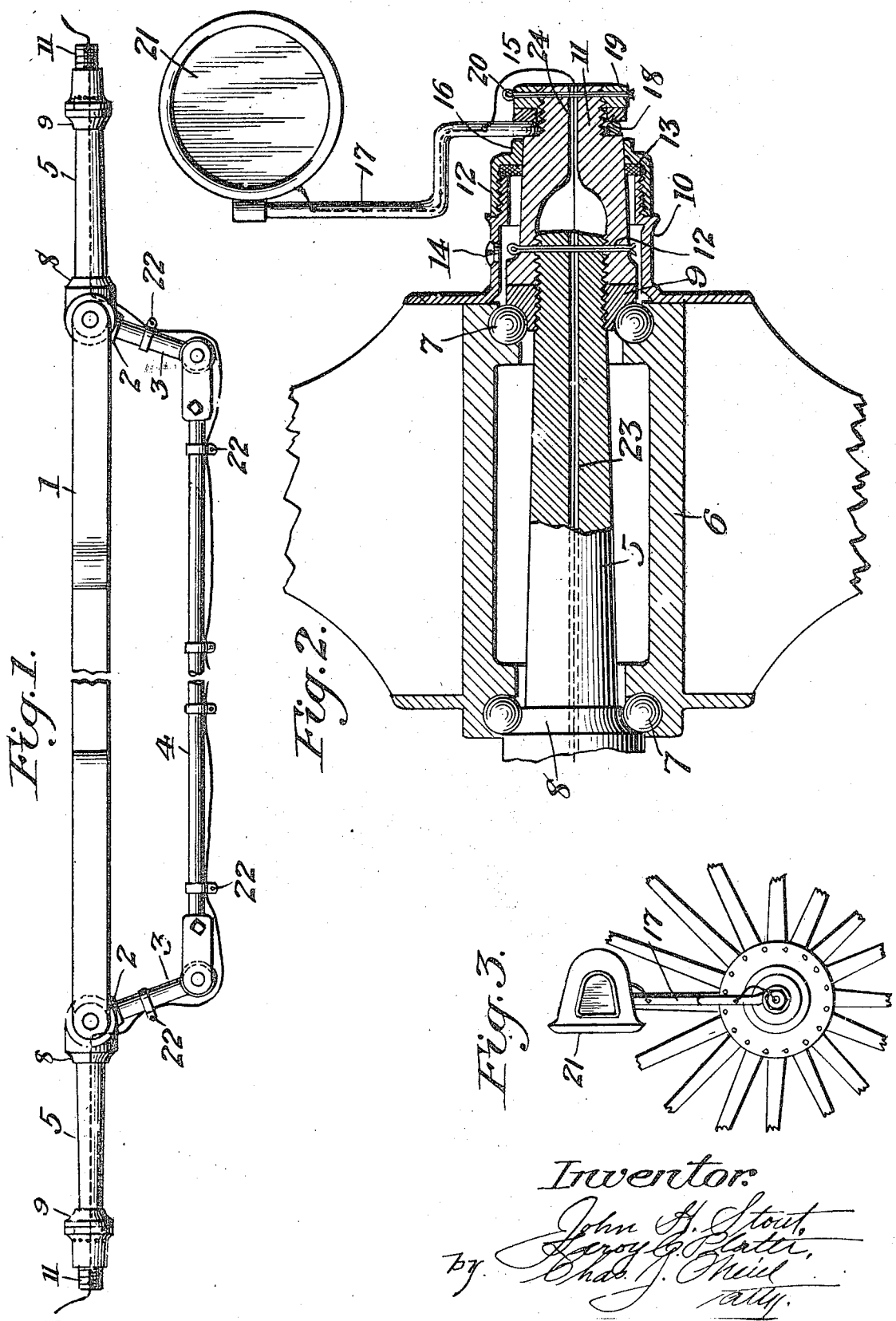

JOHN H. STOUT AND LE ROY C. PLATER, OF SCRANTON, PENNSYLVANIA.

DIRIGIBLE LIGHT FOR AUTOMOBILES.

1,317,528.          Specification of Letters Patent.     Patented Sept. 30, 1919.

Application filed March 28, 1919. Serial No. 285,797.

*To all whom it may concern:*

Be it known that we, JOHN H. STOUT and LE ROY C. PLATER, citizens of the United States, residing at Scranton, in the county of Lackawanna and State of Pennsylvania, have invented certain new and useful Improvements in Dirigible Lights for Automobiles; and we do hereby declare the following to be a full, clear, and exact description of the invention, such as will enable others skilled in the art to which it appertains to make and use the same.

This invention relates to dirigible lights for automobiles.

The head lights of an automobile are usually rigid with the body, so that when the automobile follows a turn of the road the lights maintain the angle of the body and the road ahead is left unlighted. Of course, the disadvantage here is obvious, for it is even more desirable to have the road lighted at a turn than where the road is straight. Furthermore the lamps are so placed that when the bright lights are used it is the usual practice for the motorist to turn out these lights upon the approach of an automobile from the opposite direction, so that the approaching motorist will not be forced to operate his car in the face of the bright lights. Of course, the turning out of the bright lights works a disadvantage to the driver of the automobile, since the dim lights are not ordinarily sufficient to light the road and the liability of the motorist steering his machine too far to the side of the road and running into a ditch is, of course, greatly enhanced. It will be realized that the tendency is to steer to the side of the road upon the approach of another automobile in order that there will be no likelihood of the adjacent sides of the automobiles striking each other. In order to overcome this difficulty it has become almost universal practice to mount a hand operated lamp adjacent to the driver so that upon the approach of another machine the rays of light from this hand operated lamp may be directed to the side of the road to illuminate the same and thus overcome the disadvantage of having the dim head lights. This practice, however, is not without its disadvantages, for while it is true the light rays from the hand lamp travel at an angle to the road, it is also true that there is a certain reflection of light which interferes with the approaching driver. Then again, the manipulation of the dim lights, the bright lights and the hand lamp is a source of much annoyance to the driver, which increases greatly when the number of machines approaching from the opposite direction is great and, furthermore, with the present light systems it is usually necessary for the driver to reach to the dash board of the machine in order to switch the lights and to the wind shield in order to work the hand lamp. This, of course, does not give him absolute control of the steering wheel and enhances the chance of accident.

Various dirigible head-lights have been devised, which follow the angle of the road, but these have not been successful, for the particular reason that they do not overcome all of the disadvantages above enumerated.

It is an object of our invention to provide dirigible head-lights which are so located on the machine that all of the disadvantages above enumerated are overcome. We attain this object broadly by mounting the lamps on the outer sides of the front wheels, specifically on extensions of the spindles.

It is a further object of our invention to so construct the device that it can be applied to machines of various types which are now in commercial use.

In the drawing:

Figure 1 is a plan view of the front axle of an automobile, illustrating the method of wiring the same and illustrating the manner in which the extensions are applied to the spindles;

Fig. 2 is an enlarged sectional view of the complete device; and

Fig. 3 is a side elevation of a portion of the wheel, illustrating the location of the lamp thereon.

In Fig. 1 of the drawing the front axle 1 carries at its ends the steering knuckles 2, from which extend the steering arms 3, which are connected together by the tie-rod 4. The wheel spindles 5 also extend from the steering knuckles 2 in the usual manner. On each of the spindles 5 the wheel supporting hub 6 is mounted on the ordinary ball bearings 7, the inner of which operate on a ball race 8 and the outer of which operate on a ball race 9. This latter ball race is screwed on the end of the spindle. The end of the spindle terminates within the hub extension 10 as illustrated in Fig. 2 of the drawing, but in order that the lamps may be carried by the spindle so that they will remain stationary during the rotation of the wheel, we have screwed a spindle extension 11 onto the end of the spindle 5 and secured it thereto by a cotter pin 12. Of course, this spindle extension acts as a lock nut for the ball race 9. The hub cap 12 is screwed onto the end of the hub extension 10, and interposed between the hub cap and the end of said hub extension is a felt washer 13, which prevents the escape of the grease which is used to lubricate the ball bearings and which is inserted through an opening 14 in the hub extension. The portion of the extension 11 which projects through and beyond the end of the hub cap 12 is reduced and threaded as at 15. The reduction of this extension results in the formation of a shoulder 16. The lamp bracket 17 encircles the threaded portion 15 of the extension 11 and is clamped by a lock washer 18 and a nut 19, the nut operating to firmly bind the bracket in position against the shoulder 16. This nut is securely held on the end of the extension 11 by a cotter pin 20. At the upper end of the bracket 17 a lamp 21 is carried, which in the preferred embodiment is an electric lamp. The wires leading to this lamp pass from a suitable source of supply, such as the battery of the automobile to the tie-rod 4 and along the tie rod to the steering arms 3, they being held in place on the tie rod and the steering arms by suitable clamps 22. The wires at each end extend through the adjacent steering knuckle 2 and axially through an opening 23 in the wheel spindle and through an alined opening 24 in the spindle extension 11. The wires project through the end of the hub extension and longitudinally through the adjacent bracket 17 to a point where they are attached to the lamp 21.

It will be noted that the lamp in being located on the hub extension will indicate to the driver on an approaching automobile, the greatest projection of the machine, so that he will be enabled to avoid a collision on the road at night time.

The advantages of this construction are, of course, obvious, since the lamps are located in such a position that bright lights may be used without interfering with the vision of the approaching motorist, that is to say, the light rays will be so close to the ground, that they will not shine in the eyes of the motorist. Furthermore, the lamps will follow the turns of the road and will make not only the middle of the road, but also the side thereof visible, so that there will be no possibility of the motorist steering into the side ditches in an endeavor to avoid collision. Furthermore, the use of these lamps will do away with the inconvenience of the manipulation of the lights upon the approach of another automobile, and will do away with the necessity for a hand lamp. It will be realized that many changes in the construction of the device may be made without departing from the spirit of the invention or without exceeding the scope of the claims.

What we claim is:

1. In an automobile the combination with the front wheel spindle and wheel, of a hub cap secured to the hub of the wheel, an extension secured to the end of the spindle and extending through the hub cap, a lamp carried by said extension, and a grease-tight joint between the hub cap and the extension.

2. The combination with an automobile, of an extension carried by the end of the front wheel spindle thereof, a lamp bracket carried by the end of said extension, a lamp on said bracket, said spindle extension and bracket having longitudinal passages therethrough, and electric wires extending through said passages to the lamp.

3. The combination with an automobile, of a hub cap, having an axial opening therethrough, mounted on the hub extension of the front wheel, an extension secured to the end of the front wheel spindle and projecting through the opening in the hub cap, said extension being provided with a shoulder beyond the end of the hub cap, a lamp bracket bearing against said shoulder, and means for clamping said bracket in place.

In testimony whereof we affix our signatures.

JOHN H. STOUT.
LE ROY C. PLATER.